(12) United States Patent
Sridhar et al.

(10) Patent No.: US 8,102,778 B2
(45) Date of Patent: Jan. 24, 2012

(54) NETWORK MANAGEMENT SYSTEM AND METHOD FOR PERFORMING SCALABLE LOSS MEASUREMENTS WITHIN AN ACCESS NETWORK

(75) Inventors: Kamakshi Sridhar, Plano, TX (US); Gerard Damm, Plano, TX (US); Sven Ooghe, Gentbrugge (BE)

(73) Assignee: Alcatel Lucent, Paris (FR)

( * ) Notice: Subject to any disclaimer, the term of this patent is extended or adjusted under 35 U.S.C. 154(b) by 279 days.

(21) Appl. No.: 11/956,332

(22) Filed: Dec. 13, 2007

(65) Prior Publication Data

US 2009/0161566 A1 Jun. 25, 2009

(51) Int. Cl.
*H04L 12/28* (2006.01)
*G01R 31/08* (2006.01)

(52) U.S. Cl. ..................... 370/241; 370/390; 370/395.21

(58) Field of Classification Search .................. 370/241, 370/242, 245, 247, 248, 252, 253, 395.21, 370/468, 395.4, 352, 353, 400, 230, 235, 370/232, 216, 218
See application file for complete search history.

(56) References Cited

U.S. PATENT DOCUMENTS

| | | | | |
|---|---|---|---|---|
| 6,031,818 A | * | 2/2000 | Lo et al. ..................... | 370/216 |
| 7,072,305 B1 | * | 7/2006 | Gregson ...................... | 370/241 |
| 7,355,997 B2 | * | 4/2008 | Qian et al. ................... | 370/328 |
| 7,515,542 B2 | * | 4/2009 | Hertoghs et al. ............ | 370/236.2 |
| 7,515,548 B2 | * | 4/2009 | Chandra et al. ............. | 370/252 |
| 7,602,732 B1 | * | 10/2009 | Chen et al. .................. | 370/252 |
| 2007/0268882 A1 | * | 11/2007 | Breslau et al. .............. | 370/346 |
| 2008/0008092 A1 | * | 1/2008 | Wang et al. ................. | 370/235 |
| 2008/0259809 A1 | * | 10/2008 | Stephan et al. .............. | 370/252 |
| 2009/0080340 A1 | * | 3/2009 | Duffield et al. ............. | 370/252 |
| 2010/0039943 A1 | * | 2/2010 | Ryoo et al. .................. | 370/242 |

OTHER PUBLICATIONS

Technical Report "Migration to Ethernet-Based DSL Aggregation", DSL Forum TR-101, Apr. 2006, pp. 1-101.
ITU-T Y.1731 "OAM Functions and Mechanisms for Ethernet Based Networks", May 2006, pp. 1-80.
IEEE P802.1ag/D8 "Draft Standard for Local and Metropolitan Area Networks—Virtual Bridged Local Area Networks-Amendment 5: Connectivity Fault Management" Feb. 8, 2007, pp. 1-248.

* cited by examiner

*Primary Examiner* — Hanh Nguyen
(74) *Attorney, Agent, or Firm* — Capitol Patent & Trademark Law Firm, PLLC (57) ABSTRACT

A network management system and a method are described herein that determine if one or more devices (e.g., consumer premises equipment(s)) are experiencing an unacceptable packet loss for downstream multicast traffic in an access network. In one embodiment, the network management system performs the following operations: (1) cause a trigger probe to be sent to the one or more devices, where each trigger probe contains information which causes the corresponding device to start a packet loss measurement; and (2) receive an unacceptable loss measurement message from one of the devices if that one device experienced packet losses over a certain period of time that exceeded a predetermined threshold which would be an indication that the one end device is experiencing an unacceptable packet loss.

20 Claims, 7 Drawing Sheets

NETWORK MANAGEMENT SYSTEM AND METHOD FOR PERFORMING SCALABLE LOSS MEASUREMENTS WITHIN AN ACCESS NETWORK

TECHNICAL FIELD

The present invention relates to a network management system and method that are used to determine if one or more devices (e.g., consumer premises equipment(s)) are experiencing an unacceptable packet loss for downstream multicast traffic in an access network.

BACKGROUND

The following abbreviations are herewith defined, at least some of which are referred to in the following description associated with the prior art and the present invention.

| | |
|---|---|
| AIS | Alarm Indication Signaling |
| ANCP | Access Node Control Protocol |
| BRAS | Broadband Remote Access Server |
| BTV | Broadcast Television |
| CC | Continuity check |
| CPE | Customer Premise Equipment |
| DA | Destination Address |
| DSL | Digital Subscriber Line |
| DSLAM | Digital Subscriber Line Access Multiplexer |
| EMS | Element Management System |
| IEEE | Institute of Electrical and Electronics Engineers |
| IP | Internet Protocol |
| IPTV | Internet Protocol Television |
| L2CP | Layer 2 Control Protocol |
| LB | Loopback |
| LBR | Loopback Reply |
| LT | Line Termination (customer-side of a DSLAM) |
| NT | Network Termination (network-side of a DSLAM) |
| NMS | Network Management System |
| OAM | Operation, Administration and Maintenance |
| OLT | Optical Line Termination |
| ONT | Optical Network Termination |
| PON | Passive Optical Network |
| RGW | Residential Gateway |
| TLV | Type-Length-Value |
| TV | Television |

Figure 1:
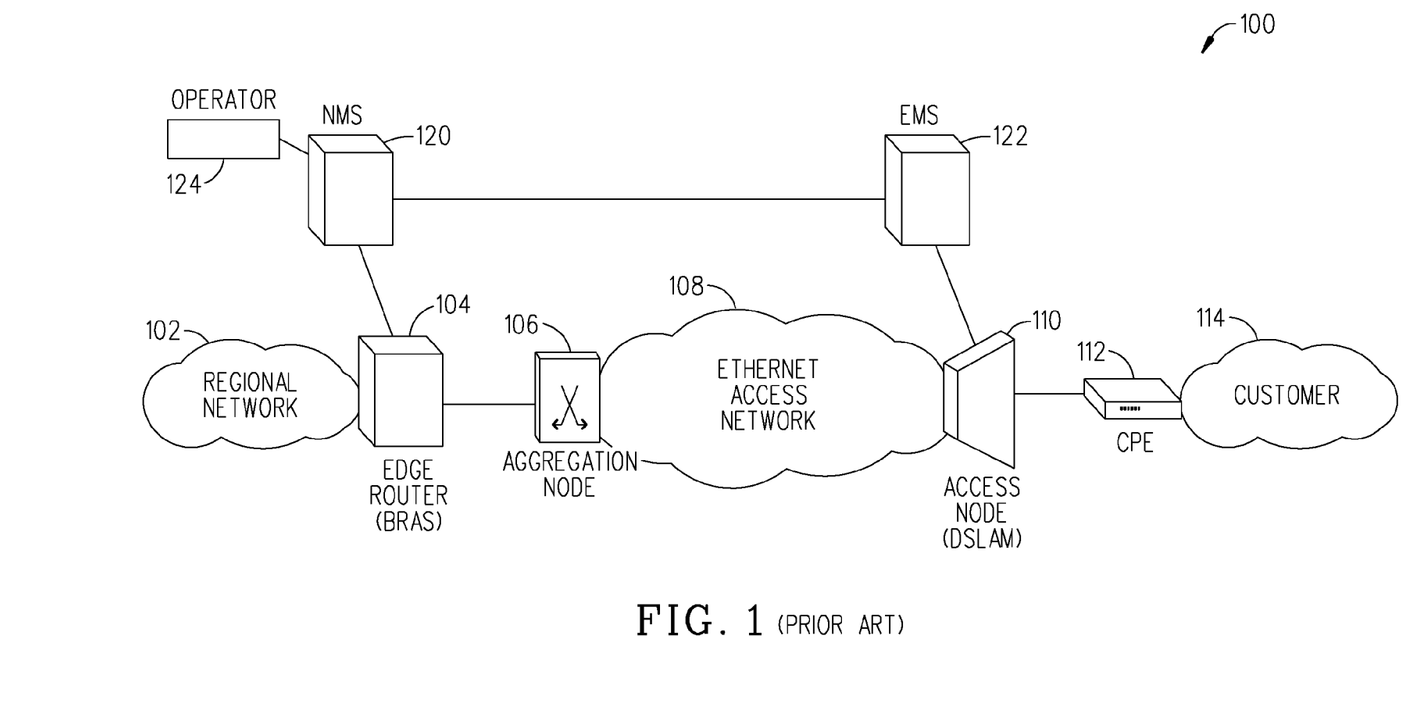
FIGS. 1-2 (PRIOR ART) are two diagrams of a traditional access network (e.g., IPTV network) which are used to help explain a problem that is solved by the present invention.
Figure 2:
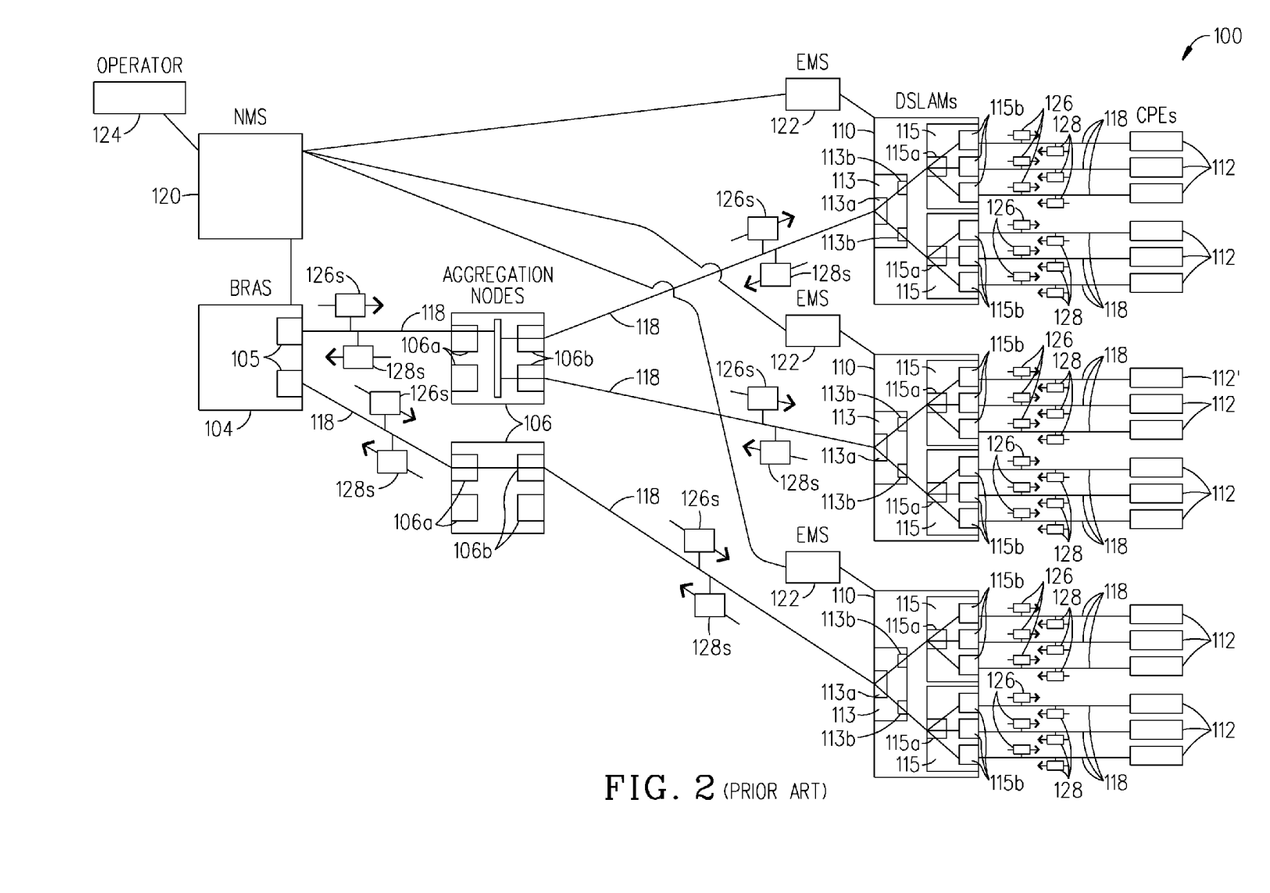

Referring to FIGS. 1-2 (PRIOR ART), there are two block diagrams of a traditional access network 100 with Ethernet-based DSL aggregation (e.g., see DSL Forum TR-101). The traditional access network 100 (e.g., IPTV network 100) includes a regional network 102 which is coupled to an edge router 104 (e.g., BRAS 104 with ports 105) which is coupled to one or more aggregation nodes 106 (with ports 106a and 106b). The aggregation node(s) 106 are connected by an Ethernet access network 108 to multiple access nodes 110 (e.g., DSLAMs 110 each of which includes a bridge-on-network-interface card 113 which has exterior-facing NT ports 113a and interior-facing NT ports 113b and a bridge-on-line card 115 which has interior-facing LT ports 115a and exterior facing LT ports 115b). The DSLAMs 110 are connected to multiple CPEs 112 (RGWs 112) which in turn are associated with multiple customers 114 where there is normally one customer 114 associated with one CPE 112. In addition, the traditional access network 100 has a NMS 120 which is directly connected to the BRAS 104 and is connected to the DSLAMs 110 via EMSs 122. Typically, an operator 124 (e.g., customer service representative 124) would interact with the NMS 120 to monitor and control the operations of the various components such as the BRAS 104 and the DSLAMs 110 which are part of the access network 100. The basic architecture and functionality of the traditional access network 100 is well known to those skilled in the art but for additional details about this type of architecture reference is made to DSL Forum TR-101 Ethernet-based DSL aggregation dated April 2006 (the contents of which are hereby incorporated by reference herein).

The BRAS 104 could be used to transmit BTV traffic 118 (multiple TV channels 118) at the Ethernet level (level 2) downstream via the aggregation node(s) 106, the Ethernet access network 108, the DSLAMs 110, and the CPEs 112 to the customers 114. In this IPTV application, the operator 124 may want to know if the CPEs 112 are experiencing an unacceptable packet loss at the Ethernet level which would adversely affect the customers 114 viewing of a broadcast TV channel. Today, the operator 124 can determine the packet loss experiences of the CPEs 112 by instructing the BRAS 104 to send standardized loopback messages 126 towards the CPEs 112 which then send standardized loopback reply messages 128 back to the BRAS 104. The standardized loopback reply messages 128 contain packet/bytes counter information which is used by the BRAS 104 to compute packet/byte loss, in both downstream and upstream directions. However, if this scheme is used to measure the packet loss measurements for all of the CPEs 112, then the BRAS 104 will be inundated with many standardized loopback reply messages 128 which are received each of the CPEs 112. This is problematic because the BRAS 104 commonly interfaces with thousands of CPEs 112 and as a result would have to process and store the packet loss information for all of the loopback reply messages 128 which are received from the CPEs 112. In addition, this scheme causes memory and processing scalability problems at the BRAS 104. Alternatively, the operator 124 could perform this test by having the BRAS 104 send the standardized loopback messages 126 to the bridge-on-line cards 115 and in particular to the exterior facing LT ports 115b within the DSLAMs 110 behind which are located the CPEs 112. But, the BRAS 104 would still suffer from the aforementioned problems because it still needs to process and store the packet loss information for all of the loopback reply messages 128 which are received from the DSLAM's exterior facing LT ports 115b. Accordingly, there has been a need and still is a need for addressing this shortcoming and other shortcomings that are associated with the traditional access network 100. This need and other needs are satisfied by the present invention.

SUMMARY

In one aspect, the present invention provides a method that could be implemented by a network management system to determine if one or more devices (e.g., CPEs, DSLAM's exterior facing LT ports) are experiencing an unacceptable packet loss for downstream multicast traffic in an access network. The method comprising the steps of: (1) causing a trigger probe to be sent to the one or more devices, where each trigger probe contains information which causes the corresponding device to start a packet loss measurement; and (2) receiving an unacceptable loss measurement message from one of the devices if that one device experienced packet losses over a certain period of time that exceeded a predetermined threshold which would be an indication that the one end device is experiencing an unacceptable packet loss.

In another aspect, the present invention provides an network management system with a processor that retrieves instructions from a memory and processes those instructions to enable the following: (1) cause a trigger probe to be sent to the one or more devices, where each trigger probe contains information which causes the corresponding device to start a packet loss measurement; and (2) receive an unacceptable loss measurement message from one of the devices if that one device experienced packet losses over a certain period of time that exceeded a predetermined threshold which would be an indication that the one end device is experiencing an unacceptable packet loss for downstream multicast traffic.

In yet another aspect, the present invention provides an edge router (e.g., BRAS) with a processor that retrieves instructions from a memory and processes those instructions to enable the following: (1) send a trigger probe to one or more devices (e.g., CPEs, DSLAM's exterior facing LT ports), where each trigger probe contains information which causes the corresponding device to start a packet loss measurement. In one embodiment, the trigger probe is a multicast continuity check message which is sent to all of the devices. In another embodiment, the trigger probe is a unicast loopback message which is sent to a selected one of the devices. In yet another embodiment, the trigger probe is an Access Node Control Protocol message which is sent to a selected one of the devices.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 3:
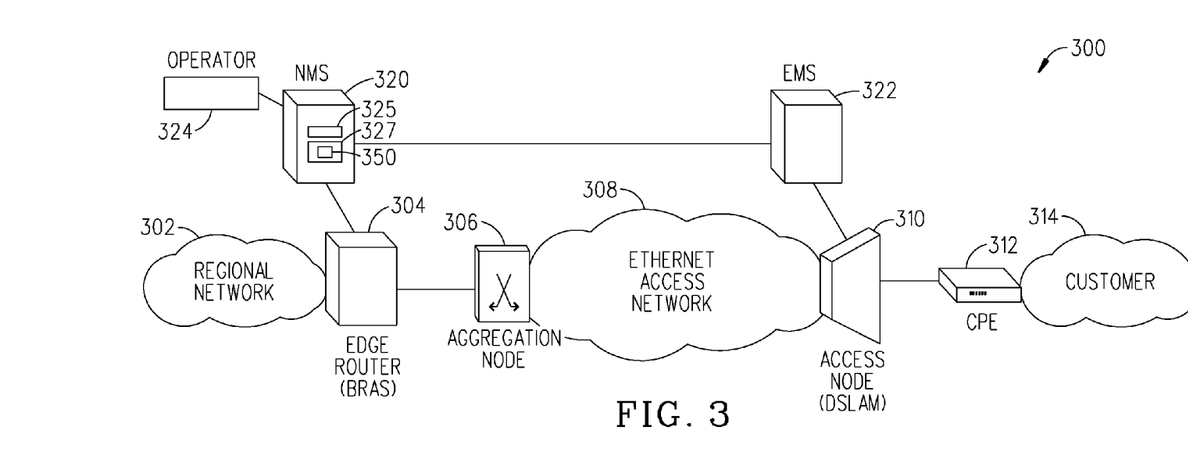
FIGS. 3-4 are two diagrams of an access network (with an Ethernet-based DSL aggregation) which has a network management system that implements a method for determining if one or more devices (e.g., CPEs, DSLAM's exterior facing LT ports) are experiencing an unacceptable packet loss in accordance with the present invention.
Figure 4:
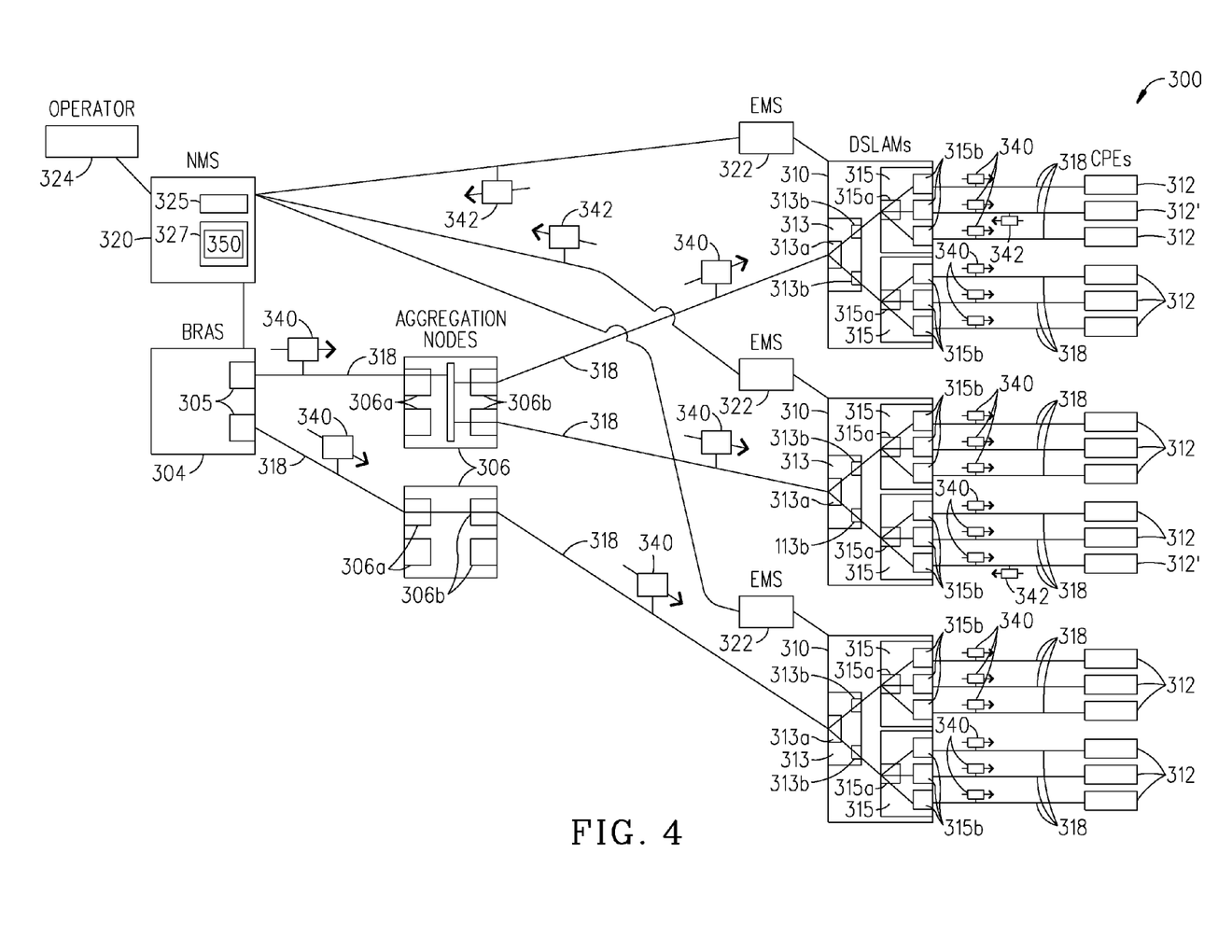

Referring to FIGS. 3-4, there are two block diagrams of an access network 300 (with an Ethernet-based DSL aggregation) which has a NMS 320 that implements a method 350 for determining if one or more devices (e.g., CPEs 312, DSLAM's exterior facing LT ports 315b) are experiencing an unacceptable packet loss for downstream multicast traffic in accordance with the present invention. The access network 300 (e.g., IPTV network 300) includes a regional network 302 which is coupled to an edge router 304 (e.g., BRAS 304 with ports 305) which is coupled to one or more aggregation nodes 306 (with ports 306a and 306b). The aggregation node(s) 306 are connected by an Ethernet access network 308 to multiple access nodes 310 (e.g., DSLAMs 310 each of which includes a bridge-on-network-interface card 313 which has exterior-facing NT ports 313a and interior-facing NT ports 313b and a bridge-on-line card 315 which has interior-facing LT ports 315a and exterior facing LT ports 315b). The DSLAMs 310 are connected to multiple CPEs 312 (RGWs 312) which in turn are associated with multiple customers 314 where there is normally one customer 314 associated with one CPE 312. In addition, the access network 300 has a NMS 320 which is directly connected to the BRAS 304 and is connected to the DSLAMs 310 via EMSs 322. An operator 324 (e.g., customer service representative 324) normally interacts with the NMS 320 to monitor and control the operations of the various components such as the BRAS 304 and the DSLAMs 310 which are part of the access network 300.

Figure 5:
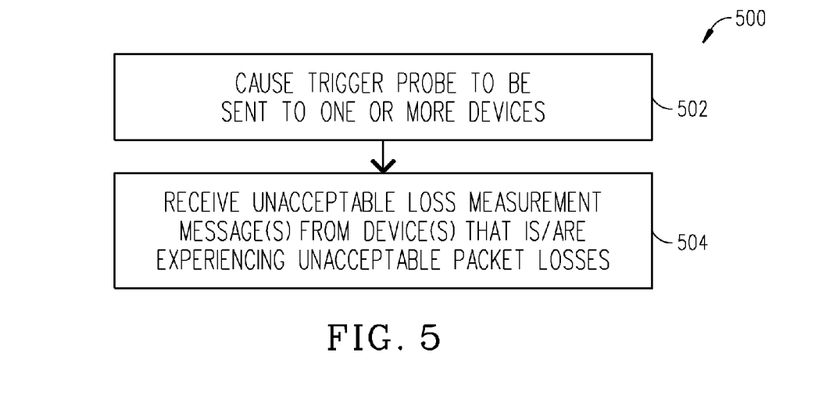
FIG. 5 is a flowchart illustrating the basic steps of the method for determining if one or more devices (e.g., CPEs, DSLAM's exterior facing LT ports) are experiencing an unacceptable packet loss in accordance with the present invention.

In one application, the BRAS 304 could be used to transmit multicast BTV traffic 318 (multiple TV channels 318) at the Ethernet level (level 2) downstream via the aggregation node(s) 306, the Ethernet access network 308, the DSLAMs 310, and the CPEs 312 to the customers 314. In this IPTV application, the operator 324 may want to test a particular CPE 312 or all of the CPEs 312 to see if one or more of them are experiencing an unacceptable packet loss at the Ethernet level which would adversely affect the respective customers 314 viewing of a broadcast TV channel. The present invention enables the operator 324 (e.g., customer service representative 324) to perform this test by providing a NMS 320 that has a processor 325 that retrieves instructions from a memory 327 and processes those instructions to implement the packet loss measurement method 350 (see flowchart in FIG. 5).

Basically, the NMS 320 and in particular the processor 325 implements the method 350 by causing trigger probe(s) 340 to be sent from the BRAS 304 to anyone or all of the CPEs 312 (step 502). In this example, the NMS 320 instructs the BRAS 304 to send a trigger probe 340 to all of the CPEs 312 (see FIG. 4). The trigger probe(s) 340 contain information which cause the receiving CPE(s) 312 to start a packet loss measurement of downstream multicast traffic from the BRAS 304. For instance, the CPE(s) 312 can perform the packet loss measurement by accessing counters located within received standardized continuity check messages (not shown) and comparing the counter contents within those standardized continuity check messages (this packet loss measurement process is discussed in more detail below). The NMS 320 receives one or more unacceptable loss measurement message 342 from one or more CPE(s) 312 if they determine that there was a certain number of packet losses over a certain period of time that exceeded a predetermined threshold (step 504). In this example, the NMS 320 receives two unacceptable loss measurement messages 342 from two CPEs 312'. Alternatively, the NMS 320 could cause the BRAS 304 to send trigger probe(s) 340 to anyone or all of the bridge-online cards 315 and in particular to their exterior facing LT ports 315b within the DSLAMs 110. Then, these DSLAM exterior facing LT ports 315b would perform the packet loss measurement of downstream multicast traffic from the BRAS 304 and if necessary send unacceptable loss measurement message(s) 342 which would indicate that their corresponding CPE(s) 312 is/are experiencing an unacceptable packet loss. Two exemplary embodiments of this method 350 are discussed in more detail below with respect to FIGS. 6-9.

Figure 6:
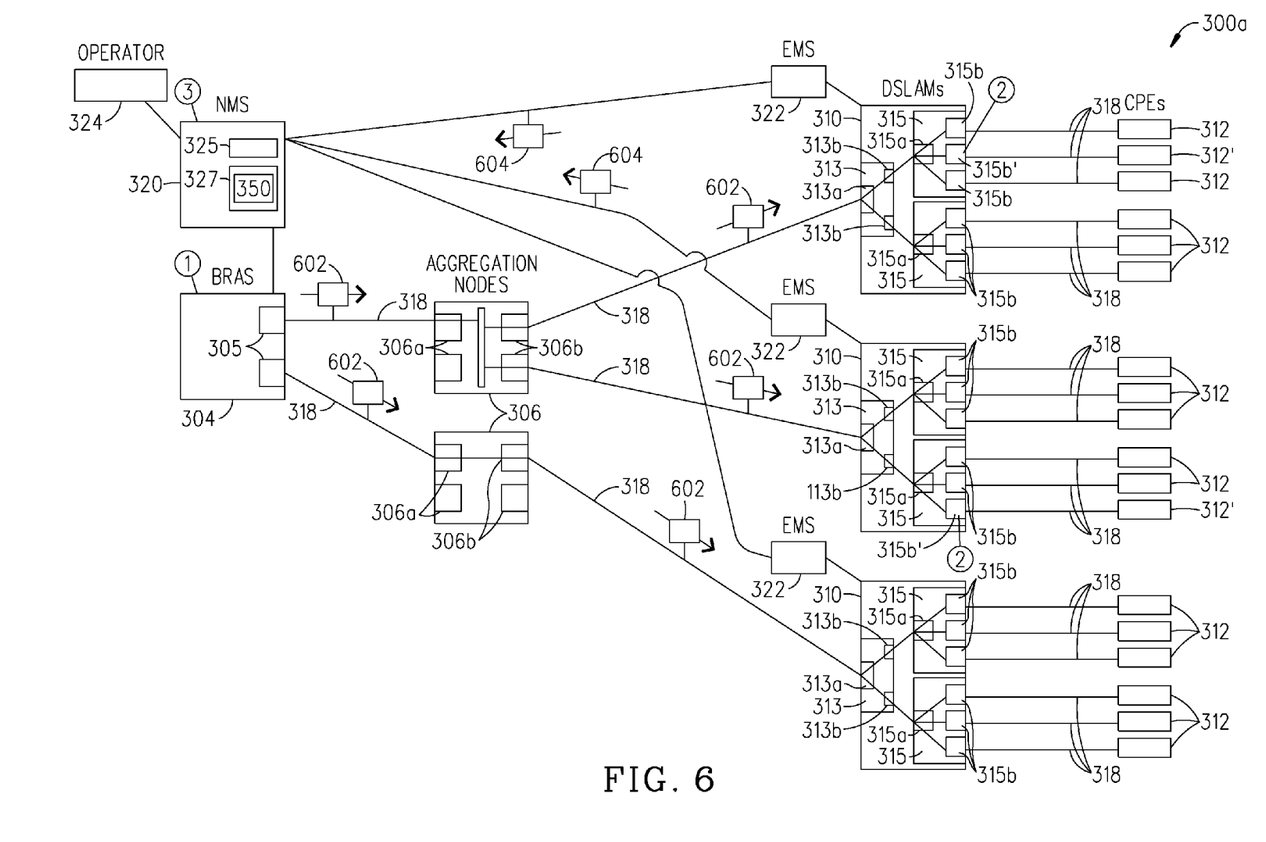
FIG. 6 is a diagram of an exemplary access network which is used to help explain how the method can be implemented in accordance with a first embodiment of the present invention.
Figure 7:
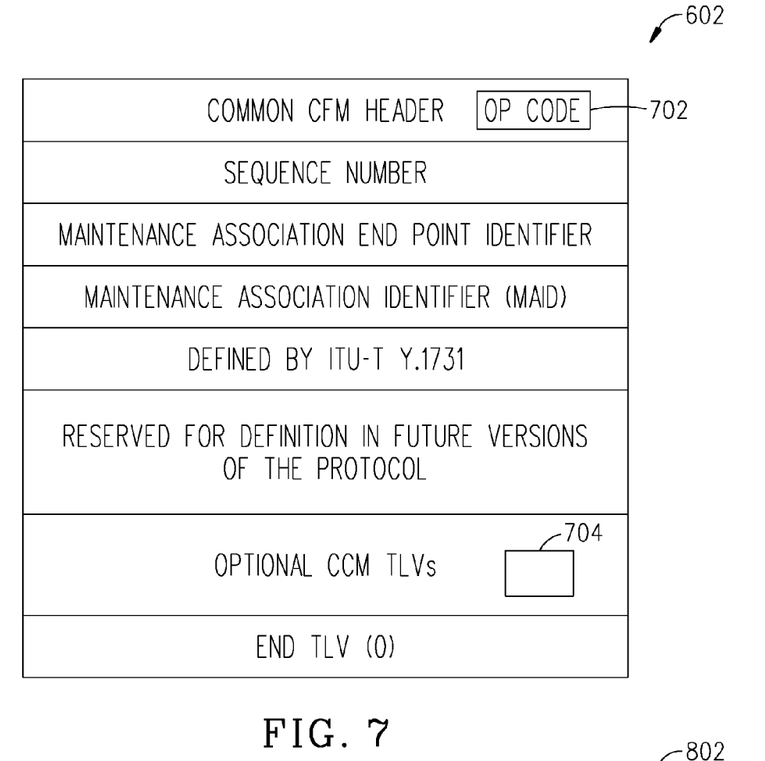
FIG. 7 is a diagram which illustrates the frame format of an exemplary multicast trigger probe (e.g., modified multicast CC message) which is discussed with respect to the access network shown in FIG. 6 in accordance with the present invention.

Referring to FIG. 6, there is a block diagram of an access network 300a which is used to help explain how the packet loss measurement method 350 can be implemented in accordance with a first embodiment of the present invention. The steps of how this particular embodiment of the packet loss measurement method 350 (which is a pro-active measurement technique) can be implemented are as follows:

1. The NMS 320 causes the BRAS 304 to send a trigger probe 602 to all of the DSLAMs 310 and in particular to their exterior facing LT ports 315b behind which are located the CPEs 312 (step 504). FIG. 7 is a diagram which illustrates the frame format of an exemplary trigger probe 602 which is a multicast CC message 602 that has an operational code field 702 with contents that cause each of the DSLAM's exterior facing LT ports 315b to access an organization specific type-length-value field 704 which contains information (e.g., a bit set to start packet loss measurement) that causes the corresponding DSLAM's exterior facing LT ports 315b to start their own packet loss measurement of downstream multicast traffic.

2. The DSLAM's exterior facing LT ports 315b (behind which are located the CPEs 312) each perform the packet loss measurements. For example, the DSLAM's exterior facing LT ports 315b can perform the packet loss measurement by accessing counters located within received standardized continuity check messages (not shown) and comparing the counter contents within those standardized continuity check messages. In particular, the DSLAM's exterior facing LT ports 315b can access counters located within the received continuity check messages and then calculate if there was a certain number of packet losses over a certain period of time that exceeded a predetermined threshold. Of course, this assumes that standardized continuity check messages are exchanged between the BRAS 304 and the DSLAM's exterior facing LT ports 315b and that these standardized continuity check messages have Y.1731 extensions that include counters. These continuity check messages and the packet loss measurement scheme are discussed in detail within the ITU-T Recommendation Y.1731 entitled "OAM Functions and Mechanisms for Ethernet Based Networks" May 2006 (the contents of which are hereby incorporated by reference herein).

3. The NMS 320 receives an unacceptable loss measurement message 604 from one of the DSLAM's exterior facing LT ports 315b if it determined there was a certain number of packet losses over a certain period of time that exceeded a predetermined threshold (step 504). In this example, two DSLAM's exterior facing LT ports 315b' had an unacceptable packet loss and as such would send unacceptable loss measurement messages 604 to the NMS 320 (none of the other DSLAM's exterior facing LT ports 315b would send an unacceptable loss measurement message 604). The unacceptable loss measurement messages 604 identify the particular CPEs 312' that are experiencing an unacceptable packet loss because those CPE 312' are located behind the DSLAM's exterior facing LT ports 315b'. For instance, the unacceptable loss measurement message 604 can be an out-band Ethernet AIS message 604, an ANCP message 604 or a L2CP message 604 that is sent through the respective EMS 322 towards the NMS 320.

Note 1: The NMS 320 could send the multicast trigger probes 602 to the CPEs 312 instead of to the DSLAM's exterior facing LT ports 315b. In this case, the CPEs 312 would perform the packet loss measurements and if necessary send the unacceptable loss measurement messages 604 to the NMS 320 via the DSLAMs 310 and the EMS 322.

Note 2: The present invention could be implemented in an access network that is based on a PON model in which case the DSLAM 310 would be replaced by an ONT and OLT where the OLT has exterior facing LT ports that could perform the packet loss measurements.

Note 3: The present invention scales very well when there are a large number of DSLAM's exterior facing LT ports 315b or CPEs 312 that are associated with a single BRAS 304. Because, only the DSLAM's exterior facing LT ports 315b or CPEs 312 that are experiencing an unacceptable packet loss would send the unacceptable loss measurement message 604 back to the BRAS 304.

Note 4: The particular example described above where the BRAS 304 sent a modified multicast CC message 602 assumed that the BRAS 304 and DSLAMs 310 (CPEs 312) were made by the same manufacturer so that the DSLAMs 310 (CPEs 312) could access the organization specific type-length-value field 704 after analyzing the content in the operational code field 702 of the multicast CC message 602. In the future, the trigger probe 602 could be standardized in which case the BRAS 304 and DSLAMs 310 (CPEs 312) could be made by the same manufacturer or different manufacturers and the DSLAMs 310 (CPEs 312) upon receiving the standardized trigger probes 602 would immediately know to perform the packet loss measurement and if needed send the unacceptable loss measurement message 604 (i.e., the DSLAMs 310 and CPEs 312 would not have to access an organization specific type-length-value field 704).

Note 5: This embodiment of the present invention can be termed as being an on-demand pro-active approach since the customer service representative 324 could initiate this test when there is high traffic and they would like to ensure that customers 314 are not experiencing poor performance.

Note 6: The multicast CC message 602 (excluding the contents in the operational code 702 and the organization specific type-length-value field 704) is discussed in more detail in ITU-T Recommendation Y.1731 entitled "OAM Functions and Mechanisms for Ethernet Based Networks" May 2006 and in the IEEE 802.1ag standard entitled "Virtual Bridged Local Area Networks-Amendment 5: Connectivity Fault Management" Feb. 8, 2007 (the contents of which are incorporated by reference herein).

Figure 8:
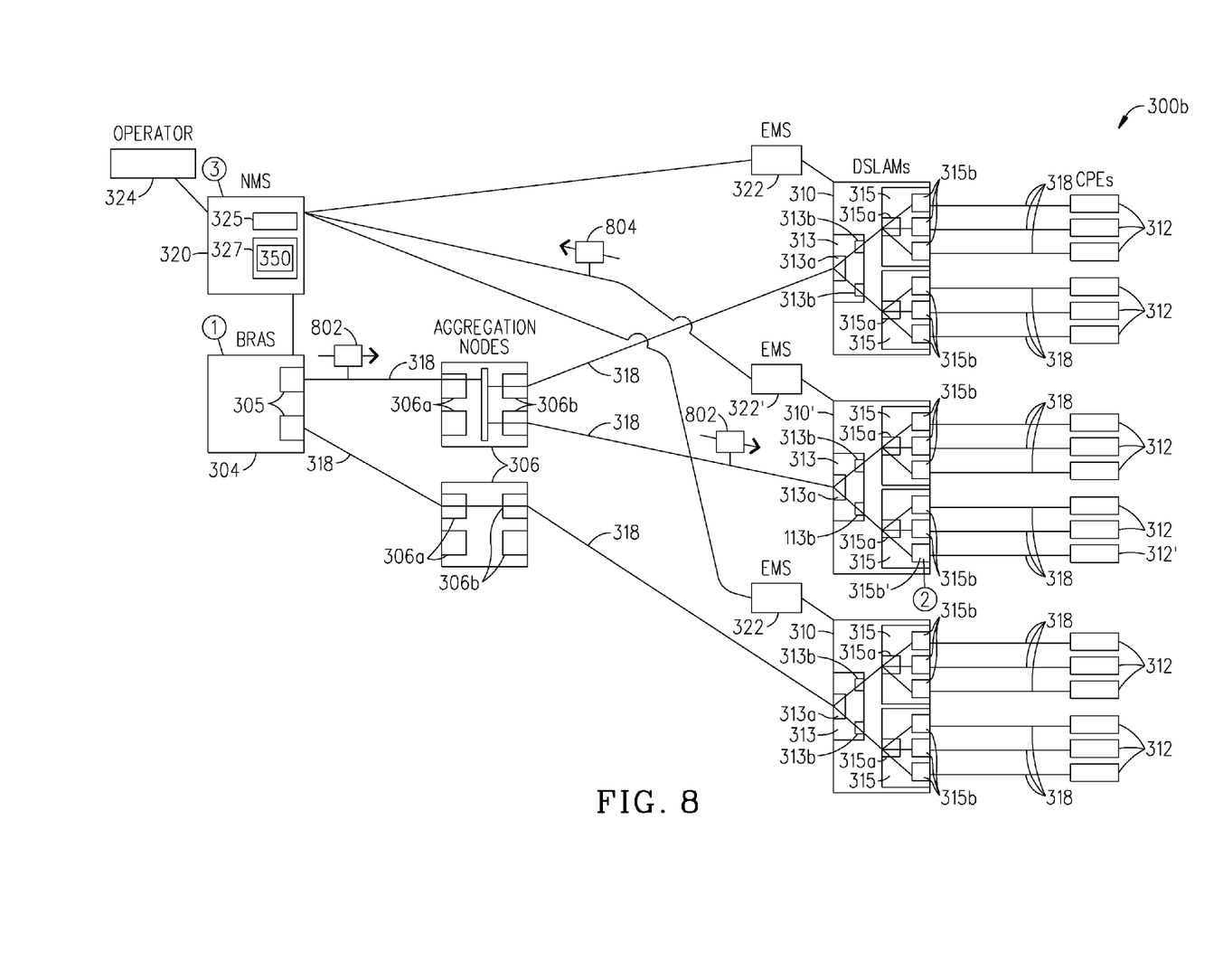
FIG. 8 is a diagram of an exemplary access network which is used to help explain how the method can be implemented in accordance with a second embodiment of the present invention.
Figure 9:
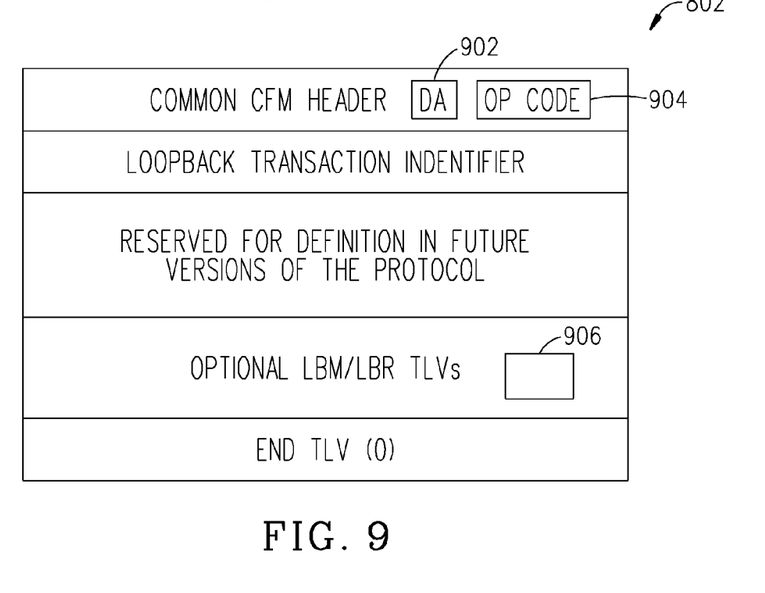
FIG. 9 is a diagram which illustrates the frame format of an exemplary unicast trigger probe (e.g., modified unicast LB message) which is discussed with respect to the access network shown in FIG. 8 in accordance with the present invention.

Referring to FIG. 8, there is a block diagram of an access network 300b which is used to help explain how the packet loss measurement method 350 can be implemented in accordance with a second embodiment of the present invention. The steps of how this particular embodiment of the packet loss measurement method 350 (which is a reactive measurement technique) can be implemented are as follows:

1. The NMS 320 causes the BRAS 304 to send a trigger probe 802 to one of the DSLAMs 310' and in particular to a specific exterior facing LT port 315b' behind which there is connected a single CPE 312' (step 504). In this situation, the customer service representative 324 may have received a call from a customer 314 that was complaining about the quality of their BTV channels and as a result the customer service representative 324 can interface with the NMS 320 to have the BRAS 304 send the trigger probe 802 to determine if that customer's CPE 312' is experiencing an unacceptable packet loss. In one example, the trigger probe 802 could be a modified loopback message 802 that does not require a reply. FIG. 9 is a diagram which illustrates the frame format of an exemplary trigger probe 802 which is a unicast LB message 802 that has a DA 902 set to the DSLAM's exterior facing LT port 315b' and an operational code field 904 with contents that cause the DSLAM's exterior facing LT port 315b' to access an organization specific type-length-value field 906 which contains information (e.g., a bit set to start packet loss measurement) that causes the DSLAM's exterior facing LT port 315b' to start a packet loss measurement. The organization specific type-length-value field 906 may also contain contents which indicate that the DSLAM's exterior facing LT port 315b' does not need to send a LBR message back to the BRAS 304. Alternatively, the NMS 320 could send a trigger probe 802 which is a modified ANCP message 802 directly to the specific DSLAMs exterior facing LT port 315b' via the EMS 322'.

2. The DSLAM's exterior facing LT port 315b' (behind which is located the particular CPE 312') performs the packet loss measurement of downstream multicast traffic between itself and the BRAS 304. For example, the DSLAM's exterior facing LT port 315b' can perform the packet loss measurement by accessing counters located within received standardized continuity check messages (not shown) and comparing the counter contents within those standardized continuity check messages. In particular, the DSLAM's exterior facing LT port 315b' can access counters located within the received continuity check messages and then calculate if there was a certain number of packet losses over a certain period of time that exceeded a predetermined threshold. Of course, this assumes that standardized continuity check messages are exchanged between the BRAS 304 and the DSLAM's exterior facing LT port 315b' and that these standardized continuity check messages have Y.1731 extensions that include multicast downstream traffic counters. This packet loss measurement scheme is discussed in detail within the ITU-T Recommendation Y.1731 entitled "OAM Functions and Mechanisms for Ethernet Based Networks" May 2006 (the contents of which are hereby incorporated by reference herein).

3. The NMS 320 receives an unacceptable loss measurement message 804 from the DSLAM's exterior facing LT port 315b' if it determined there was a certain number of packet losses over a certain period of time that exceeded a predetermined threshold (step 504). Of course, none of the other DSLAM's exterior facing LT ports 315b would perform a packet loss measurement or send an unacceptable loss measurement message 804 since they never received the trigger probe 802. The unacceptable loss measurement message 804 identifies the particular CPE 312'. For example, the unacceptable loss measurement message 804 can be an out-band Ethernet AIS message 804, an ANCP message 804 or a L2CP message 804 that is sent through the EMS 322' to the NMS 320.

Note 1: The NMS 320 could send the unicast trigger probe 802 directly to the CPE 312' instead of to the DSLAM's exterior facing LT port 315b'. In this case, the CPE 312' would perform the packet loss measurement and if necessary send the unacceptable loss measurement message 604 to the NMS 320 via the DSLAM 310' and the EMS 322'.

Note 2: The present invention could be implemented as well in an access network that is based on a PON model in which case the DSLAM 310 would be replaced by an ONT and OLT where the OLT has exterior facing LT ports that could perform the packet loss measurements.

Note 3: The unicast LB message 802 (excluding the contents in the operational code 904 and the organization specific type-length-value field 906) is discussed in more detail in ITU-T Recommendation Y.1731 entitled "OAM Functions and Mechanisms for Ethernet Based Networks" May 2006 and in the IEEE 802.1ag standard entitled "Virtual Bridged Local Area Networks-Amendment 5: Connectivity Fault Management" Feb. 8, 2007 (the contents of which are incorporated by reference herein).

Although two embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the spirit of the invention as set forth and defined by the following claims.

The invention claimed is:

1. A method for determining unacceptable packet losses in downstream multicast traffic for one or more devices in an access network, said method comprising the steps of:
    causing a trigger probe to be sent to the one or more devices, wherein each trigger probe contains information which causes the corresponding device to start a packet loss measurement, and wherein each device performs the packet loss measurement by accessing counters located within a plurality of received continuity check messages and comparing the counter contents within the plurality of received continuity check messages; and
    receiving an unacceptable loss measurement message from one of the devices indicating a number of packet losses over a certain period of time exceeds a predetermined threshold and that the device is experiencing unacceptable packet losses.

2. The method of claim 1, wherein a network management system is operable to perform the causing step and the receiving step.

3. The method of claim 1, wherein said trigger probe is a multicast continuity check message which is sent by an edge router to all of the devices.

4. The method of claim 3, wherein said multicast continuity check message has an operational code field with contents that cause each of the devices to access an organization specific type-length-value field which contains the information that causes the corresponding device to start the packet loss measurement.

5. The method of claim 1, wherein said trigger probe is a unicast loopback message which is sent by an edge router to a selected one of the devices.

6. The method of claim 5, wherein said unicast loopback message has an operational code field with contents that cause the selected device to access an organization specific type-length-value field which contains the information that causes the selected device to start the packet loss measurement.

7. The method of claim 1, wherein said trigger probe is an Access Node Control Protocol message which is sent to a selected one of the devices.

8. The method of claim 1, wherein each device is a line termination in a bridge-on-line card that is incorporated within an access node.

9. The method of claim 1, wherein each device is a consumer premises equipment.

10. A network management system, comprising:
    a processor;
    a memory; and instructions which are accessible from said memory and processable by said processor to enable the following:

causing a trigger probe to be sent to the one or more devices, wherein each trigger probe contains information which causes the corresponding device to start a packet loss measurement performed by accessing counters located within a plurality of received continuity check messages and comparing the counter contents within the plurality of received continuity check messages; and receiving an unacceptable loss measurement message from one of the devices indicating a number of packet losses over a certain period of time exceeds a predetermined threshold and that the device is experiencing unacceptable packet losses for downstream multicast traffic.

11. The network management system of claim 10, wherein said trigger probe is a multicast continuity check message which is sent by an edge router to all of the devices.

12. The network management system of claim 11, wherein said multicast continuity check message has an operational code field with contents that cause each of the devices to access an organization specific type-length-value field which contains the information that causes the corresponding device to start the packet loss measurement.

13. The network management system of claim 10, wherein said trigger probe is a unicast loopback message which is sent by an edge router to a selected one of the devices.

14. The network management system of claim 13, wherein said unicast loopback message has an operational code field with contents that cause the selected device to access an organization specific type-length-value field which contains the information that causes the selected device to start the packet loss measurement.

15. The network management system of claim 10, wherein said trigger probe is an Access Node Control Protocol message which is sent to a selected one of the devices.

16. An edge router, comprising:
a processor; and
a memory, where said processor retrieves instructions from said memory and processes those instructions to enable the following:
sending a trigger probe to one or more devices, wherein each trigger probe contains information which causes the corresponding device to start a packet loss measurement performed by accessing counters located within a plurality of received continuity check messages and comparing the counter contents within the plurality of received continuity check messages; and
receiving an unacceptable loss measurement message from one of the devices indicating a number of packet losses over a certain period of time exceeds a predetermined threshold and that the device is experiencing unacceptable packet losses.

17. The edge router of claim 16, wherein said trigger probe is a multicast continuity check message which is sent to all of the devices, and wherein said multicast continuity check message has an operational code field with contents that cause each of the devices to access an organization specific type-length-value field which contains the information that causes the corresponding device to start the packet loss measurement.

18. The edge router of claim 16, wherein said trigger probe is a unicast loopback message which is sent to a selected one of the devices, and wherein said unicast loopback message has an operational code field with contents that cause the selected device to access an organization specific type-length-value field which contains the information that causes the selected device to start the packet loss measurement.

19. The edge router of claim 16, wherein said trigger probe is an Access Node Control Protocol message which is sent to a selected one of the devices.

20. A method for determining unacceptable packet losses in downstream multicast traffic for one or more line terminations in an access network, each line termination being in a bridge-on-line card incorporated within an access node, wherein said method comprises the steps of:
causing a trigger probe to be sent to the one or more line terminations, wherein each trigger probe contains information which causes the corresponding line termination that is being in the bridge-on-line card to start a packet loss measurement; and
receiving an unacceptable loss measurement message from one of the line terminations indicating a number of packet losses over a certain period of time exceeds a predetermined threshold and that the line termination is experiencing unacceptable packet losses.

* * * * *